Patented Jan. 29, 1952

2,584,017

UNITED STATES PATENT OFFICE 2,584,017

WASHING COMPOSITION

Vladimir Dvorkovitz and Thomas G. Hawley, Jr., Chicago, Ill., assignors to The Diversey Corporation, a corporation of Illinois No Drawing. Application September 30, 1947, Serial No. 777,112

3 Claims. (Cl. 252—156)

This invention relates to a composition that is particularly applicable for washing bottles and other forms of glassware and to the washing solutions prepared from such compositions.

The industries that wash large quantities of bottles and other glassware, such as the dairy, brewery, and soft drink bottlers, have found it expedient to adopt a continuous process wherein the bottles are conveyed first through a tank or tanks containing a strongly alkaline solution and then through a rinsing solution. The glassware is maintained in the alkaline solution until it has become cleaned. It has been found that when the glassware and those parts of the equipment adjacent the glassware pass through the alkaline solutions, they are coated with a film of alkali. When the alkali-coated objects are immersed in the rinse water, an immediate precipitation occurs of the dissolved calcium and magnesium salts that are present in the rinse water. The precipitated solids form a hard scale on the glassware and particularly on the equipment. Because of the intimate contact of the film of alkali with the glassware and equipment, the precipitate appears to be more adherent and accounts for the scale type of deposition rather than the more desirable sludge or non-adherent precipitate. This scale continues to build up on the equipment until it is necessary that the scale be removed. This removal involves a considerable economic loss in time, labor and materials employed in the scale removal.

The problem of the scale formation has received considerable recognition and much effort has been spent to overcome it. For example, many complex alkali metal salts of phosphoric acid have the property of holding calcium and magnesium compounds in solution that are normally insoluble. Certain amino carboxylic acid derivatives have also been used for this purpose. It has been found, however, that none of these compounds work effectively in the presence of sodium hydroxide. Thus, a sufficient quantity of sodium hexametaphosphate will hold the hard water precipitates usually obtained by adding sodium carbonate or sodium orthophosphate to a hard water solution. However, long standing of the product or standing at less time at elevated temperatures causes hydrolysis of the resulting complex and causes precipitation of the calcium and magnesium compounds. This effect is even more pronounced if even small quantities of caustic alkalis are present.

The present invention is concerned with means for preventing the formation of this scale on glassware and on parts of the equipment used in washing the glassware that comes in contact with the washing and rinsing solutions. We have found that a composition comprising a water soluble alkali metal hydroxide such as sodium hydroxide or potassium hydroxide and an alkali metal salt of a hydroxy carboxylic acid having a total of at least three of the radicals: hydroxyl and carboxyl, will prevent or at least minimize the formation of an adherent hard water scale. The hydroxides of sodium and potassium are preferred because of their inexpensiveness and availability, but the hydroxides of other elements of the alkali metal group may be used if desired. One of the salts which has been found to be particularly effective is sodium gluconate. The alkali metal salts include those of gluconic acid, citric acid, tartaric acid, mucic acid, and malic acid as well as many others. The acids themselves may also be used.

The fact that these salts will not form precipitates in the presence of sodium hydroxide is surprising as it has been noted that precipitates will form when such alkalis as sodium carbonate, sodium orthophosphate, sodium silicate and the like are employed with the salts in the absence of sodium hydroxide and the like. These alkaline materials may be used, however, if they are used in combination with sodium hydroxide.

It has been found that even if some scale is formed on the equipment or is mechanically picked up by passage through a sludge, it is redissolved when it is repassed through the caustic soda-salt solution.

The solution is quite stable and can be maintained at 150° F. for two weeks or more without any apparent decomposition or precipitation. The compositions that are employed in making the washing solutions preferably contain from 5 to 99% by weight of an alkaline material including an alkali metal hydroxide and from 95 to 1% of the alkali metal salt of the hydroxy carboxylic acid. The major proportion of the alkaline material should be the hydroxide. An alkali stable wetting agent may also be used in preparing the solutions.

In testing the value of the invention, solutions were prepared employing a Chicago city water that had an approximate hardness of 150 P. P. M., 3% by weight of sodium hydroxide and 0.2% of various sequestering or repressing agents. The solutions were formed and their appearance was noted. They were all heated until the water boiled and any difference in appearance was also noted. Some of the materials prevented precipitation at room temperatures and at moderately elevated temperatures, but most were such that on raising the temperature precipitation occurred. In some cases this was due to the decomposition of the agent employed and in other cases was probably caused by the inability to maintain the precipitate in solution at the higher temperatures.

Some of the results that were obtained are as follows:

TABLE I

*3% NaOH solution in Chicago tap water*

| Sequestering or Repressing Agent | Appearance at 25° C. | Appearance at 100° C. |
|---|---|---|
| .2% Sodium gluconate | clear | clear. |
| .2% Glucose | ppt | ppt. |
| .2% Sorbitol | ppt | ppt. |
| .2% Sodium hexametaphosphate | ppt | ppt. |
| .2% Tripolyphosphate | ppt | ppt. |
| .2% Sodium tetraphosphate | ppt | ppt. |
| .2% Tetrasodium pyrophosphate | ppt | ppt. |
| .2% Nullapon A | ppt | ppt. |
| .2% Nullapon B | ppt | ppt. |
| .2% Alrose water softener Alro | ppt | ppt. |
| .2% Saccharic acid | clear | ppt. |
| .2% Acetic acid | ppt | ppt. |
| .2% Citric acid | ppt. slight | ppt. |
| .2% Tartaric acid | clear | ppt. |
| .2% Itaconic acid | ppt | ppt. |
| .2% Ascorbic acid | ppt | ppt. |
| .2% Pimelic | ppt | ppt. |
| .2% Lactobionic acid | ppt | ppt. |
| .2% Glutamic acid | ppt | ppt. |
| .2% Succinic acid | ppt | ppt. |
| .2% Mucic acid | clear | slight ppt. |
| .2% Sodium carboxy methyl cellulose (med. visc.) | do | Do. |
| .2% Malic acid | do | ppt. |

If the 3% caustic soda solution were added to hard water containing as high as 3% of a complex phosphate such as sodium hexametaphosphate, a precipitate would form. It has been found that the effect of the salt of the hydroxy carboxylic acid is in the main independent of the concentration of the caustic soda. Thus, solutions of caustic soda as high as 30% can be used when only 0.2% of the salt is used. However, very minute quantities of caustic soda can allow the formation of a precipitate, and it has thus been found that the solution must have a pH higher than 12 for effective results.

The results shown in Table I show the difference between precipitation and the prevention of precipitation. The table does not, however, indicate where the amount of precipitate is reduced. It was discovered that some of the hydroxy carboxylic acids and their salts might permit the formation of a considerable amount of precipitate, but the amount of scale deposited on the glassware or equipment was reduced. This effect in preventing scale as apart from preventing precipitation might be due to some effect which delays the precipitation and prevents its deposition on the glassware and equipment. All the hydroxy carboxylic acids and their salts appear to have at least this latter effect.

The caustic soda-salt combination also serves to prevent softening and subsequent scratching of the glassware. It has been found that the addition of such agents as trisodium phosphate, sodium carbonate, or the like, to sodium hydroxide solutions assist in the cleaning of glassware. However, these agents have a marked effect in that they serve as catalysts for the sodium hydroxide and cause it to soften and partially dissolve the glass. Hence, the glass is more easily marked by the machinery or by abrasion against other pieces of glass and soon receives an unsightly appearance. The use of the caustic soda-salt solutions as cleansing agents avoids this softening and dissolving. Tests were made to prove this fact. Various solutions were prepared using 5% concentrations of sodium hydroxide. The materials used and the results obtained are shown in the following table. In obtaining these results, the glass was held in contact with each solution for 72 hours at 145° F.

TABLE II

| Composition | Per cent loss in weight of clear milk bottle glass | Per cent loss in weight of green soft drink bottle glass |
|---|---|---|
|  | Per cent | Per cent |
| 90% NaOH<br>10% Sodium gluconate | .037 | .034 |
| 100% NaOH | .102 | .092 |
| 95.0% NaOH<br>5.0% Sodium Aluminate | .077 | .067 |
| 96.0% NaOH<br>4.0% Na₂HPO₄ | .267 | .173 |
| 94.5% NaOH<br>5.0% Sodium gluconate<br>.5% Nullapon B | .054 | .052 |
| 94.0% NaOH<br>4.0% Trisodium phosphate<br>2.0% Sodium aluminate | .117 |  |

Another advantage to be obtained by the use of sodium-hydroxide-salt combination is that the solution serves as a better inhibitor of rust and corrosion of steel and iron than sodium hydroxide solutions alone. Still another advantage is that the solutions are relatively nonfoaming.

The following table lists, on a dry basis, some of the many possible combinations that have been used successfully in cleaning operations and which because of the incorporation of a caustic soda-sodium gluconate combination do not give precipitation or reduce precipitation to a marked degree in hard water solutions.

TABLE III

| Components | Components by Wgt. | | | | | |
|---|---|---|---|---|---|---|
| Caustic soda | 90 | 80 | 89.5 | 85 | 81.5 | 91 |
| Sodium gluconate | 10 | 20 | 10.0 | 5 | 7.5 | 5 |
| Trisodium phosphate |  |  |  |  | 1.0 | 2 |
| Sodium carbonate |  |  |  | 10 | 10.0 |  |
| Zinc oxide |  |  |  |  |  | 2 |
| Sodium salt of higher alkyl sulfates |  |  | .5 |  |  |  |

The wetting agent that may be used includes any alkali stable wetting agent such as alkali salts of higher alkyl sulfates, sodium dodecyl benzene sulfonate, alkyl naphthalene sodium sulfonates, sodium salts of sulfonated ethers, as well as many others.

Although it has been found that the combination of sodium hydroxide and an alkali metal salt of a hydroxy carboxylic acid containing at least three of the radicals: hydroxyl and carboxyl, serve to prevent a marked formation of a hard water scale, it has also been found that this combination has been further improved by the provision of an alkali metal salt of an amino carboxylic acid derivative having the general formula

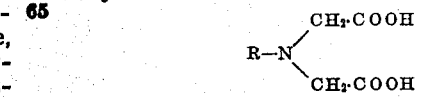

where R is a member of the class consisting of

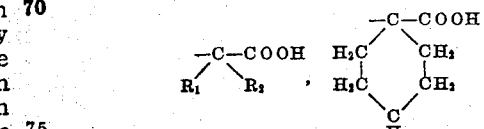

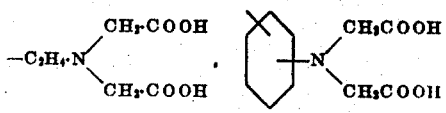

where $R_1$ and $R_2$ are members of the class consisting of hydrogen and aliphatic and aromatic groups. The groups may contain substituents so long as the resulting compounds are still water soluble.

The combination of the above amino carboxylic acid derivatives together with, for example, sodium gluconate are effective agents for repressing precipitates that would normally be formed if mixtures of caustic soda with other alkalis such as soda ash or the alkali metal salts of phospohric acid were added to hard water. It has also been found that other combinations of alkali metal salts of amino carboxylic acids and hydroxy carboxylic acids are effective in preventing or diminishing the formation of precipitates when alkalis containing free caustic alkalis are added to hard water. Thus, the compounds obtained from the phenylene diamines by reaction with chloroacetic acid are effective in combination with, for example, sodium gluconate in preventing the precipitation of calcium and magnesium salts from hard water.

If 0.5% of an alkali metal salt of an amino polycarboxylic acid derivative is added to hard water of 150 P. P. M. hardness and then 5% of caustic soda added, an immediate gelatinous precipitate is formed which does not go into solution on raising the temperature above ordinary room temperature. If instead of using the caustic soda, 5% of soda ash or 5% of trisodium phosphate is added, either no precipitate is formed or a light gelatinous precipitate is formed that dissolves on warming the solution. If a mixture of caustic soda with either soda ash or trisodium phosphate is added to the water containing the alkali metal salt of an amino polycarboxylic acid derivative, a precipitate is formed regardless of the relative concentration so long as at least 5% of the total alkali is caustic alkali.

As an example of the effectiveness of sodium gluconate or the like, if 0.5% of the amino compound and 0.5% of sodium gluconate are added to the hard water and then 5% of caustic soda and 5% of sodium carbonate added, a clear solution results that stays clear even when heated to boiling and then permitted to stand overnight. Similarly, the sodium carbonate may be substituted by trisodium phosphate and the resulting solution remains clear even when brought to the boiling point and permitted to stand overnight. The use of sodium gluconate only does not permit such high concentration of sodium carbonate or trisodium phosphate without the formation of a precipitate.

Acids such as acetic acid or polyalcohols such as glycerine or sorbitol do not have this effect with the amino polycarboxylic acid salt, but hydroxy acids, for example, citric acid, maleic acid, tartaric acid, and mucic acid to prevent or reduce the formation of precipitates when used in combination with the above-mentioned amino carboxylic acid derivatives. Thus, if 0.05% of the amino derivative and 0.25% of mucic acid are added to Chicago tap water and 4.5% of caustic soda and 0.5% of trisodium phosphate are added, a clear solution results in the cold, but on warming a light gelatinous precipitate begins to separate at about 190° F. If the mucic acid is substituted by tartaric acid, the same results are obtained.

Furthermore, if 0.25% of sodium gluconate and 0.2% of the alkali metal salt of the amino carboxylic acid derived from the reaction of paraphenylene diamine with chloroacetic acid are added to Chicago tap water and then a mixture of 2.5% caustic soda and 2.5% soda ash are added, the resulting solution is free from precipitates and can be brought to the boiling point and still remain clear.

Various other tests were performed to show the effectiveness of the present invention in eliminating or reducing the precipitates formed when using caustic soda in hard water. These tests and their results are summarized in the following table:

TABLE IV

| | Alkali Combination | Hydroxy Acid or Salt thereof (or other agent in cases where [1]) | Amino carboxylic Acid derivative | Condition of Soln. at 150° F. |
|---|---|---|---|---|
| 1. | 5% NaOH | Glycerin [1] | .05% sodium ethylene bis imino diacetate. | precipitate. |
| 2. | 5% NaOH | Sorbitol [1] | .05% sodium ethylene bis imino diacetate. | Do. |
| 3. | 4.5% NaOH .5% Trisodium phosphate. | .5% Tartaric acid | .05% sodium ethylene bis imino diacetate. | clear. |
| 4. | 4.5% NaOH .5% Trisodium phosphate. | | .05% sodium ethylene bis imino diacetate. | precipitate. |
| 5. | 4.5% NaOH .5% Trisodium phosphate. | .5% Tartaric acid | | Do. |
| 6. | 4.5% NaOH .5% Trisodium phosphate. | .25% Gluconic acid | .05% sodium ethylene bis imino diacetate. | clear. |
| 7. | 4.5% NaOH .5% Trisodium phosphate. | | .05% N N, N'N' tetra methyl tetra carboxylic acid deriv. of phenylene diamine. | precipitate. |
| 8. | 4.5% NaOH .5% Trisodium phosphate. | .5% sodium gluconate | .05% N N, N'N' tetra methyl tetra carboxylic acid deriv. of phenylene diamine. | clear. |
| 9. | 4.5% NaOH .5% Trisodium phosphate. | .5% sodium gluconate | | precipitate. |

When .5 gm. of the sodium salt of trimethyl amino a, a', a'', tricarboxylic acid is added to 100 grams of Chicago tap water and then 5 grams of NaOH be added, a light gelatinous precipitate results. If instead of adding 5 gms. of NaOH, 5 gms. of soda ash had been added the resultant solution would have been clear. Now, if to this clear carbonate solution 5 gms. of NaOH is added a precipitate results. Now, however, if .5 gm. of the sodium salt of trimethyl amino a, a', a'', tricarboxylic acid together with .5 gm. of sodium gluconate and then 5 gms. of NaOH and 5 gms. of Na₂CO₃ are added, a clear solution results. This shows the effect therefore of the use of a combination of hydroxy acid and amino carboxylic acid derivative in preventing precipitation.

As examples of the invention, an identical experiment was repeated using different solutions whereby a continuous steel chain of known weight was passed through a caustic solution and then through a rinse water of 1000 P. P. M. hardness and back through the caustic solution. This was repeated continuously for a period of eight hours when the chain was removed from the system, dried, and weighed and its appearance noted. The scale, when present, was visible and the exact weights of scale were obtained. Both the caustic and the rinse solutions were maintained at 150° F. The results were as follows:

TABLE V

| 5% alkali solutions comprising: | Appearance of Chain | Weight of scale in grams |
|---|---|---|
| Caustic Soda 100% | Heavy white scale | .2586 |
| Caustic Soda 90% / Sodium carbonate 10% | Heavy white scale | .1172 |
| Caustic Soda 96% / Disodium phosphate 4% | Heavy white scale | .5409 |
| Caustic Soda 90% / Sodium Hexametaphosphate 10% | Heavy white scale | .115 |
| Caustic Soda 90% / Sorbitol 10% | Heavy white scale | .159 |
| Caustic Soda 90% / Sodium gluconate 10% | Bright like new | [1] .0039 |
| Caustic Soda 94.5% / Sodium gluconate 5.0% / Nullapon B 5% | Bright, very slight scale | .0461 |
| Caustic Soda 90% / Citric Acid 10% | Bright, very slight scale | .0458 |
| Caustic Soda 90% / Sodium carboxymethyl cellulose 10% | Bright, very slight scale | .0262 |
| Caustic Soda 90% / Tartaric acid 10% | Bright, very slight scale | .101 |
| Caustic Soda 90% / 2-4, 3-5 dimethylene gluconic acid 10% | Slight scale | .1373 |
| Caustic Soda 90% / 3-6 D Glucosaccharolactone 10% | Slight scale | .1336 |

[1] Slight increase.

The Nullapon B is ethylene bis imino diacetic acid, or a salt thereof; specifically, it is sodium ethylene bis imino diacetate.

The hydroxy carboxylic acids are known to give lactones when subjected to an intermolecular dehydration process. This dehydration is shown in the following equation:

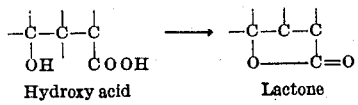

Hydroxy acid → Lactone

In an aqueous solution of the alkali, the lactone can hydrolyze to give the alkali salt of the hydroxy carboxylic acid. Thus, it is possible to use lactones in place of the acids or the salts and the description and the claims herein are intended to include the use of such lactones tha are hydrolyzed in solution to the salt of a hydroxy carboxylic acid.

In preparing the compositions the hydroxy carboxylic acid and/or the amino carboxylic acid may be used instead of the salts thereof as the acids are converted into the salts when in solution with the alkaline compounds.

When in the specification and claims it is stated that a pH of at least 12 is obtained, this means that such pH is obtained in the presence of sufficient water to give a pH reading.

Having described our invention as related to the embodiment described herein, it is our intention that the invention be not limited by any of the details of description unless otherwise specified, but rather be construed broadly within its spirit and scope as set out in the accompanying claims.

We claim:
1. A composition consisting essentially of a mixture of 1 to 20% sodium gluconate and 99 to 80% alkaline material, with some of the alkaline material being sodium carbonate in an amount up to about 10% thereof and the remainder being sodium hydroxide.

2. A composition adapted for making a washing solution with water for washing glassware, comprising about 90 to 99 parts by weight of a caustic alkali, and sufficient gluconate of the class consisting of sodium gluconate and potassium gluconate to prevent the formation of a hard adherent scale from the hardness constituents of the water and to inhibit the attack by the alkali on glassware, the gluconate being present in an amount up to about 10 parts by weight.

3. A composition adapted for making a washing solution with water for washing glassware, comprising about 90 parts by weight of sodium hydroxide and about 10 parts by weight of sodium gluconate.

VLADIMIR DVORKOVITZ.
THOMAS G. HAWLEY, Jr.

REFERENCES CITED

The following references are of record in the file of this patent:

UNITED STATES PATENTS

| Number | Name | Date |
|---|---|---|
| 729,600 | Jones | June 2, 1903 |
| 2,145,827 | Chester | Jan. 31, 1939 |
| 2,291,085 | Lehmkuhl et al. | July 28, 1942 |
| 2,346,562 | De Long | Apr. 11, 1944 |
| 2,419,805 | Wegst et al. | Apr. 29, 1947 |

FOREIGN PATENTS

| Number | Country | Date |
|---|---|---|
| 885,521 | France | May 31, 1943 |